(12) United States Patent
Wehrmann et al.

(10) Patent No.: US 9,496,901 B2
(45) Date of Patent: Nov. 15, 2016

(54) METHOD AND APPARATUS FOR RADIO FREQUENCY TUNING UTILIZING A DETERMINED USE CASE

(71) Applicant: BlackBerry Limited, Waterloo (CA)

(72) Inventors: Christopher Wehrmann, Bochum (DE); Jens Kampermann, Haan (DE); Andreas Handro, Münster (DE)

(73) Assignee: BlackBerry Limited, Waterloo (CA)

(*) Notice: Subject to any disclaimer, the term of this patent is extended or adjusted under 35 U.S.C. 154(b) by 327 days.

(21) Appl. No.: 13/659,245

(22) Filed: Oct. 24, 2012

(65) Prior Publication Data

US 2014/0113679 A1 Apr. 24, 2014

(30) Foreign Application Priority Data

Oct. 22, 2012 (EP) .................................... 12189423

(51) Int. Cl.
| | | |
|---|---|---|
| *H04B 1/04* | (2006.01) | |
| *H04B 1/18* | (2006.01) | |
| *H04B 17/29* | (2015.01) | |
| *H04B 17/318* | (2015.01) | |
| *H04B 7/08* | (2006.01) | |
| *H04B 17/10* | (2015.01) | |

(52) U.S. Cl.
CPC .............. *H04B 1/0458* (2013.01); *H04B 1/18* (2013.01); *H04B 17/29* (2015.01); *H04B 17/318* (2015.01); *H04B 7/0837* (2013.01); *H04B 17/102* (2015.01)

(58) Field of Classification Search
CPC ..................... H04B 1/0458; H04B 1/18; H04B 17/008; H04B 17/0057; H04B 7/0837; H04B 17/0032

See application file for complete search history.

(56) References Cited

U.S. PATENT DOCUMENTS

| | | | |
|---|---|---|---|
| 2005/0113039 A1 | 5/2005 | Tsukamoto | |
| 2009/0121963 A1 | 5/2009 | Greene | |
| 2009/0253385 A1 | 10/2009 | Dent et al. | |
| 2010/0073103 A1* | 3/2010 | Spears et al. | ................ 333/17.3 |
| 2010/0105425 A1* | 4/2010 | Asokan | ....................... 455/552.1 |
| 2010/0232474 A1 | 9/2010 | Rofougaran | |
| 2011/0021166 A1 | 1/2011 | Walley et al. | |
| 2011/0053524 A1* | 3/2011 | Manssen et al. | ............... 455/77 |
| 2011/0117973 A1* | 5/2011 | Asrani et al. | ................ 455/571 |
| 2011/0249765 A1 | 10/2011 | Han | |

(Continued)

*Primary Examiner* — Dong-Chang Shiue

(74) *Attorney, Agent, or Firm* — Guntin & Gust, PLC; Robert Gingher

(57) ABSTRACT

A system that incorporates teachings of the present disclosure may include, for example, a memory, a transceiver, a plurality of antennas coupled with the transceiver, a matching network coupled with at least one of the plurality of antennas, a detector coupled with the matching network where the detector obtains operational data associated with at least two of the plurality of antennas, and a controller circuit coupled with the detector and the matching network. The controller circuit can analyze the operational data to determine an operational data differential between the at least two of the plurality of antennas. The controller circuit selects a use case for the communication device from among a group of use cases stored in the memory based on the operational data differential. Additional embodiments are disclosed.

19 Claims, 11 Drawing Sheets

(56) References Cited

U.S. PATENT DOCUMENTS

| | | |
|---|---|---|
| 2012/0112851 A1 | 5/2012 | Manssen et al. |
| 2012/0112852 A1* | 5/2012 | Manssen et al. ............. 333/105 |
| 2012/0214421 A1* | 8/2012 | Hoirup et al. ............. 455/67.11 |
| 2012/0295554 A1* | 11/2012 | Greene et al. ................. 455/77 |
| 2013/0038502 A1* | 2/2013 | Erdem ......................... 343/861 |
| 2013/0130631 A1* | 5/2013 | Song et al. .................... 455/78 |
| 2013/0156080 A1* | 6/2013 | Cheng ................... H01Q 1/243 |
| | | 375/222 |
| 2014/0024321 A1* | 1/2014 | Zhu et al. ...................... 455/77 |

\* cited by examiner

Set Open/closed Loop tuner into ideal (Frees-space) state
(predefined starting state to determine used cases)

Head hand Right
ΔRSSI=RX0−RX1=e.g.      −6dB+/−2dB
Relative phase@RX1=range (270−340deg)

Head hand Left
ΔRSSI=RX0−RX1=e.g.      5dB+/−2dB
Relative phase@RX1=range (70−130deg)

Hand Right
ΔRSSI=RX0−RX1=e.g.      −15dB+/−2dB
Relative phase@RX1=range (0−50deg)

Hand Left
ΔRSSI=RX0−RX1=e.g.      10dB+/−2dB
Relative phase@RX1=range (150−230deg)

Use case X
ΔRSSI=RX0−RX1=e.g.      XXdB+/−2dB
Relative phase@RX1=range (xx−yy)

LOOK-UP TABLE

| |
|---|
| Band 1; Use Case 1; Desired tuning state |
| Band 1; Use Case 2; Desired tuning state |
| ⋮ |
| Band 1; Use Case n; Desired tuning state |
| Band 2; Use Case 1; Desired tuning state |
| Band 2; Use Case 2; Desired tuning state |
| ⋮ |
| Band 2; Use Case n; Desired tuning state |
| Band N; Use Case 1; Desired tuning state |
| Band N; Use Case 2; Desired tuning state |
| ⋮ |
| Band N; Use Case n; Desired tuning state |

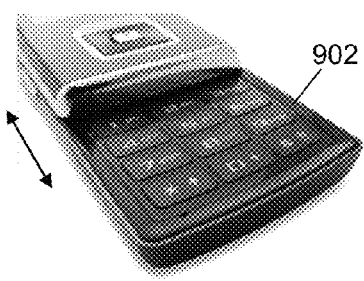
600
FIG. 6
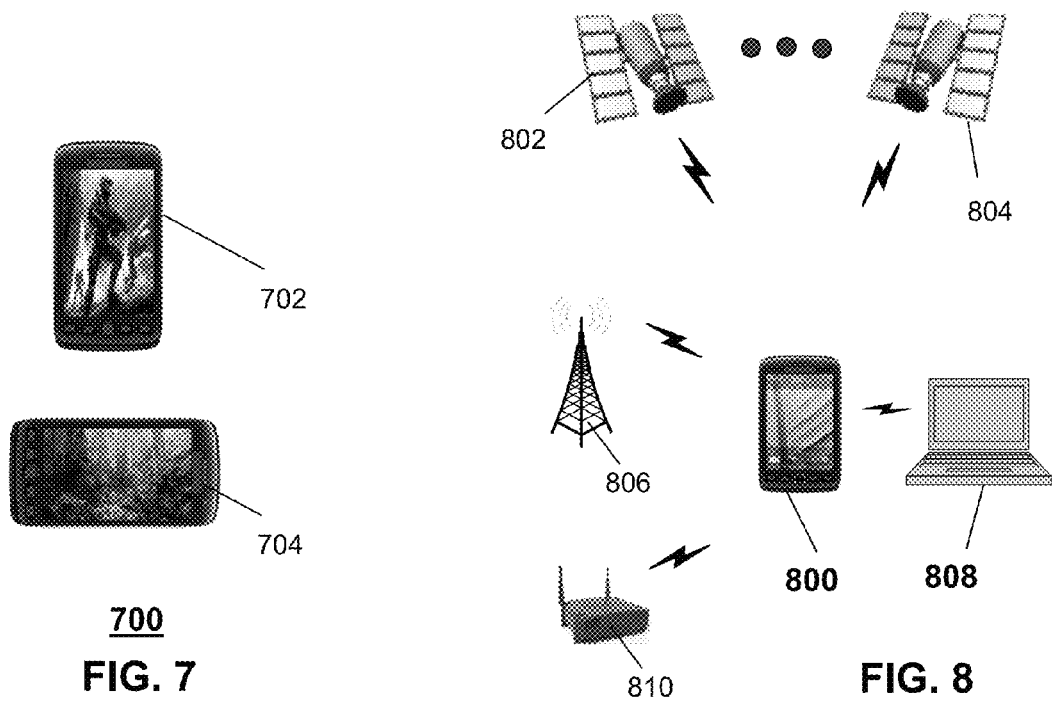
700
FIG. 7
FIG. 8

METHOD AND APPARATUS FOR RADIO FREQUENCY TUNING UTILIZING A DETERMINED USE CASE

CROSS-REFERENCE TO RELATED APPLICATIONS

This application claims priority to EP Application Serial Number 12189423.2 filed Oct. 22, 2012, which is incorporated herein by reference in its entirety.

FIELD OF THE DISCLOSURE

The present disclosure relates to a method and apparatus for radio antenna frequency tuning and in particular determining a use case in order to perform the impedance tuning in a communication device.

BACKGROUND

Existing multi-frequency wireless devices (e.g., radios) use an antenna structure that attempts to radiate at optimum efficiency over the entire frequency range of operation, but can really only do so over a subset of the frequencies. Due to size constraints, and aesthetic design reasons, the antenna designer is forced to compromise the performance in some of the frequency bands. An example of such a wireless device could be a mobile telephone that operates over a range of different frequencies. The antenna will not radiate efficiently at all frequencies due to the nature of the design, and the power transfer between the antenna, the power amplifier, and the receiver in the radio will vary significantly.

Additionally, an antenna's performance is impacted by its operating environment. For example, multiple use cases exist for radio handsets, which include such conditions as the placement of the handset's antenna next to a user's head, or in the user's pocket or the covering of an antenna with a hand, all of which can significantly impair the wireless device antenna's radiated efficiency.

Further, many existing radios use a simple circuit composed of fixed value components that are aimed at improving the power transfer from power amplifier to antenna, or from the antenna to the receiver, but since the components used are fixed in value there is always a compromise when attempting to cover multiple frequency bands and multiple use cases.

BRIEF DESCRIPTION OF THE DRAWINGS

FIGS. 3-4 depict an illustrative embodiment of look-up tables that can be utilized by the communication device of FIG. 1;

FIGS. 5a-8 depict illustrative physical and operational use cases of the communication device of FIG. 1;

DETAILED DESCRIPTION

Figure 1:
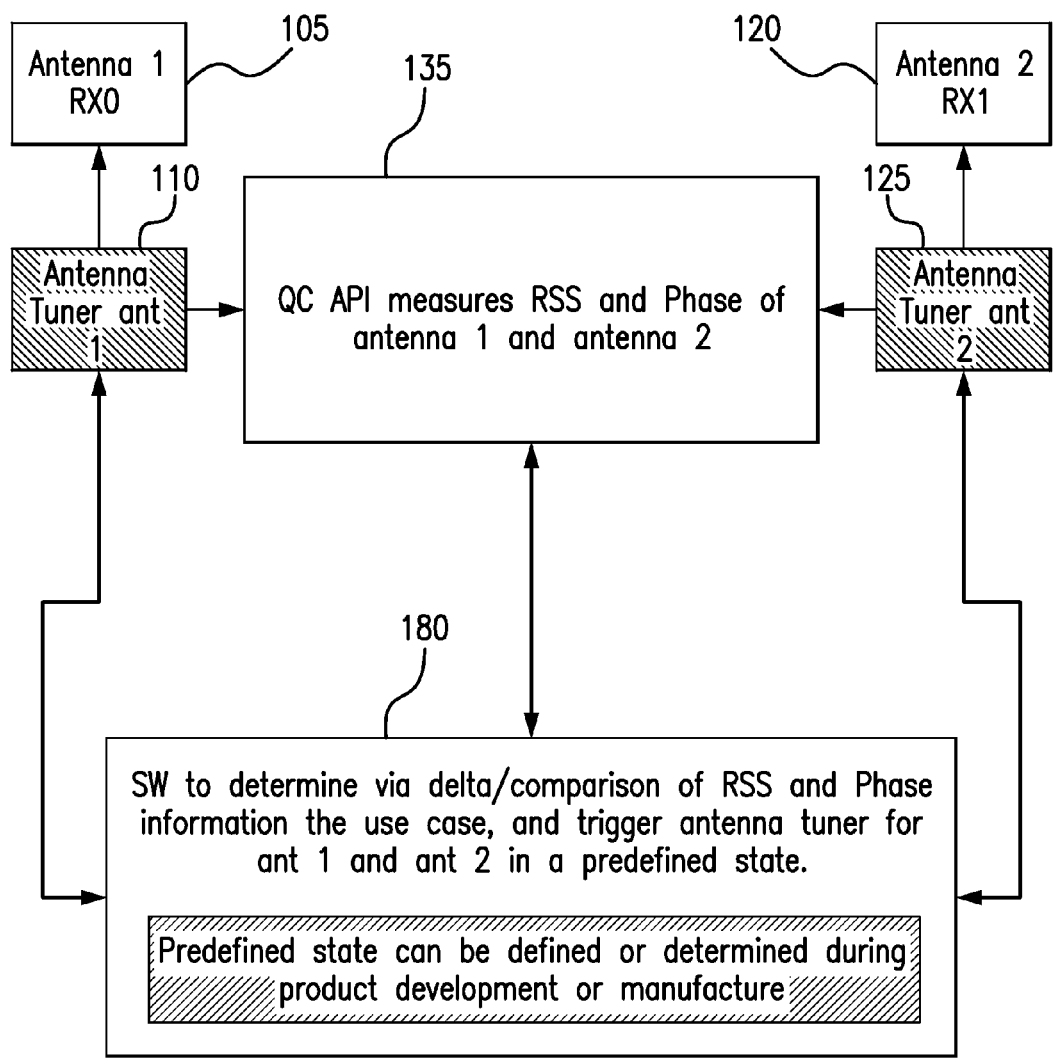
FIG. 1 depicts an illustrative embodiment of a portion of a multi-antenna communication device that can determine or detect use cases and perform impedance tuning.

The present disclosure provides a method and apparatus for radio antenna frequency tuning. One or more exemplary embodiments can identify or determine a use case for a communication device by selecting the use case from among a group of use cases based on operational data associated with antennas of the communication device. For example, Receive Signal Strength Indicator (RSSI) information and phase information can be obtained for first and second antennas and the differential of the RSSI and phase, respectively for each antenna, can be used in selecting a use case from a look-up table that has been mapped to these differentials. The mapping of the look-up table can be based on empirical data, such as from chamber testing. In one or more embodiments, the selected use case can be used for performing impedance tuning, such as in an open loop algorithm or in combination with a closed loop algorithm utilizing a variable reactance of a tunable element of a matching network coupled with one or both of the first and second antennas. In one or more embodiments, the detection or determination of the use case can be repeated throughout operation of the mobile device, such as periodically and/or based on a detected operational parameter change (e.g., detected motion of the device, detected change in measured metrics associated with the transceiver, and so forth). By repeating the detection or determination of the use case, the mobile device can identify when there has been a change in use case for the mobile device (e.g., a user has switched from left hand up to head state to hands free operation state) and can tune according to the newly detected use case.

In one or more embodiments, a use case (e.g., mobile device held in left or right hand or held against the head) can be detected or otherwise determined based on a comparison of operational data associated with different antennas of the mobile device. The determined use case, which in this example can be determined without user input and without mechanical sensor feedback, can be utilized for impedance tuning of one or more matching networks associated with one or more of the antennas. For example, one or more of the matching networks can be set to a predefined stage based on the use case where the predefined stage is determined during product development to perform better or best at that specific use case. In this example, the Total Radiated Power (TRP) and/or Total Isotropic Sensitivity (TIS) and/or throughput performance can be improved or maximized based on the tuning, which can be open loop or a combination of open and closed loops.

In one exemplary embodiment, a mobile communication device can include a first antenna and a first matching network coupled with a transceiver, where the first matching network includes a first tunable element with a variable reactance for impedance tuning. The mobile communication device can include a second antenna and a second matching network coupled with the transceiver, where the second matching network includes a second tunable element with a variable reactance for impedance tuning. The mobile communication device can include a detector coupled with the first and second matching networks, where the detector obtains RSSI information and phase information for the first and second antennas. The mobile communication device can include a controller circuit coupled with the detector and the first and second matching networks, where the controller circuit analyzes the RSSI information and the phase information to determine an RSSI differential and a phase differential between the first and second antennas. The controller circuit can select a use case for the mobile communication device from among a group of use cases based on the RSSI differential and the phase differential.

In one exemplary embodiment, a method can include obtaining, by a detector of a mobile communication device, RSSI information and phase information for a first and second antenna of the mobile communication device. The method can include determining, by a controller circuit of the mobile communication device, an RSSI differential and a phase differential between the first and second antennas based on the RSSI information and the phase information. The method can include selecting, by the controller circuit, a use case for the mobile communication device from among a group of use cases based on the RSSI differential and the phase differential.

In one exemplary embodiment, a communication device can include a memory, a transceiver and a plurality of antennas coupled with the transceiver. The communication device can also include a matching network coupled with at least one of the plurality of antennas, and a detector coupled with the matching network, where the detector obtains operational data associated with at least two of the plurality of antennas. The communication device can further include a controller circuit coupled with the detector and the matching network, where the controller circuit analyzes the operational data to determine an operational data differential between the at least two of the plurality of antennas. The controller circuit can select a use case for the communication device from among a group of use cases stored in the memory based on the operational data differential.

Referring to FIG. 1, a portion of a communication device 100 is illustrated having multiple antennas 105, 120 and corresponding tunable matching networks 110, 125. In this exemplary embodiment, there are two antennas 105, 120, which can be a transmit/receive antenna and a diversity reception antenna. However, it should be understood that other numbers, types and/or configurations of antennas can be utilized with device 100. For instance, the antennas can be spatially diverse, pattern diverse, polarization diverse and/or adaptive array antennas. The tunable matching networks 110 and 125 allow for tuning and/or detuning of one or more of the antennas 105, 120.

The matching networks 110, 125 can include one or more tunable elements (e.g., a capacitor(s) with a tunable dielectric constant and/or a capacitor(s) of a fixed capacitance controlled by one or more micro-electromechanical systems (MEMS) switches, one or more mechanical switches, and/or one or more semiconductor switches) that enable impedance tuning. The one or more tunable elements can also be other types of components that have a variable and adjustable reactance that enables the impedance tuning. Matching networks 110, 125 are illustrated as separate networks that are connected to a feed or input/output port of the antenna. However, the matching networks 110, 125 can be combined into a single matching network that can perform impedance tuning for both antennas 105, 120, such as through use of switches that select desired variable reactance components for performing tuning. In one or more embodiments, one or both of the matching networks 110, 125 can be on-antenna tuning matching networks, such that the tunable element(s) are connected (e.g., directly) with radiating elements or a portion thereof of the antenna 105 and/or 120. In another embodiment, multiple matching networks (e.g., a first matching network connected at the antenna feed and a second matching network connected directly to one or more of the radiating elements) can be connected to a single antenna (such as antenna 105 or antenna 120).

One or more of the exemplary embodiments can also be other types of multiple antenna systems, such as a MIMO (multiple-input and multiple output) system. The multiple antennas can be utilized for improving communications, such as through switching or selecting techniques, including analyzing noise in the multiple signals and selecting the most appropriate signal. The multiple antennas can also be used with combining techniques where the signals can be added together, such as equal gain combining or maximal-ratio combining. Other techniques for utilizing multiple signals from multiple antennas are also contemplated by the exemplary embodiments, including dynamic systems that can adjust the particular techniques being utilized, such as selectively applying a switching technique and a combination technique. The particular position(s) of the antenna(s) can vary and can be selected based on a number of factors, including being in close enough proximity to couple RF energy with each other. Communication device 100 can include a number of other components, such as directional couplers, sensor ICs, bias control and other control ICs. As an example, a transceiver of the communication device 100 can include multiple receivers and/or transmitters for the multiple antennas 105 and 120 to serve the purpose of diversity reception. The tunable matching networks 110, 125 can include various other components in addition to, or in place of the components described above, including components described below with respect to the other exemplary embodiments.

Communication device 100 can include a detector 135 or other device for measuring or otherwise determining parameters associated with the antennas 105, 120. The parameters can include the RSSI and the phase associated with the antennas 105, 120. In one embodiment, the detector 135 can be an application programming interface that measures the desired parameters. Communication device 100 can also include a controller 180 that identifies or otherwise determines a use case for the communication device (e.g., without user input and/or without mechanical sensors detecting a mechanical configuration (such as slider out) of the communication device). The controller 180 can be various types of devices, such as a micro-controller or other component having software, which performs an algorithm to compare RSSI information for the antennas 105, 120 and to compare phase information for the antennas to detect a difference or delta to identify or otherwise determine the present use case of the communication device.

Communication device 100 is illustrated with a separate detector 135 and controller 180 where both components are coupled with the matching networks 110, 125 as well as coupled with each other. However, one or more of the exemplary embodiments can utilize other configurations of components in order to acquire and analyze the RSSI and phase information of the antennas 105, 120 (or other antenna parameters), such as integrating the detector 135 and the controller 180 into a single component. Communication device 180 can perform antenna tuning for one or both of the antennas 105, 120 (via adjusting one or both of the matching networks 110, 125) based on the identified use case. The use case can be utilized in an open-loop tuning algorithm (e.g., selecting tuning values for one or more variable reactances based on a look up table or other stored values mapped to the use case) and/or can be utilized in conjunction with a closed-loop algorithm (e.g., the use case is a parameter of the algorithm that also relies upon operational parameters of the communication device, such as output power of the transmitter, return loss, received power, current drain and/or transmitter linearity). In one or more embodiments, the pre-defined tuning states, which are mapped to the use cases, can be determined during product development or manufacture based on empirical data. For example, empirical data can be stored in a look-up table that is based on a desired TRP and/or TIS, and which can be indexed based on use cases. In this example, the empirical data can be obtained through chamber testing under various conditions, including under various use cases. In another embodiment, the empirical data can be indexed (e.g., in combination with the use cases) based on other factors including operating frequency, device mode of operation, device operating metrics, and so forth. In another embodiment, the empirical data of the look-up table can be based on desired Uplink (UL) and/or Downlink (DL) throughput, which can be indexed based on use cases. In this embodiment, the empirical data can be indexed (e.g., in combination with the use cases) based on other factors including operating frequency, device mode of operation, device operating metrics, and so forth.

Figure 2:
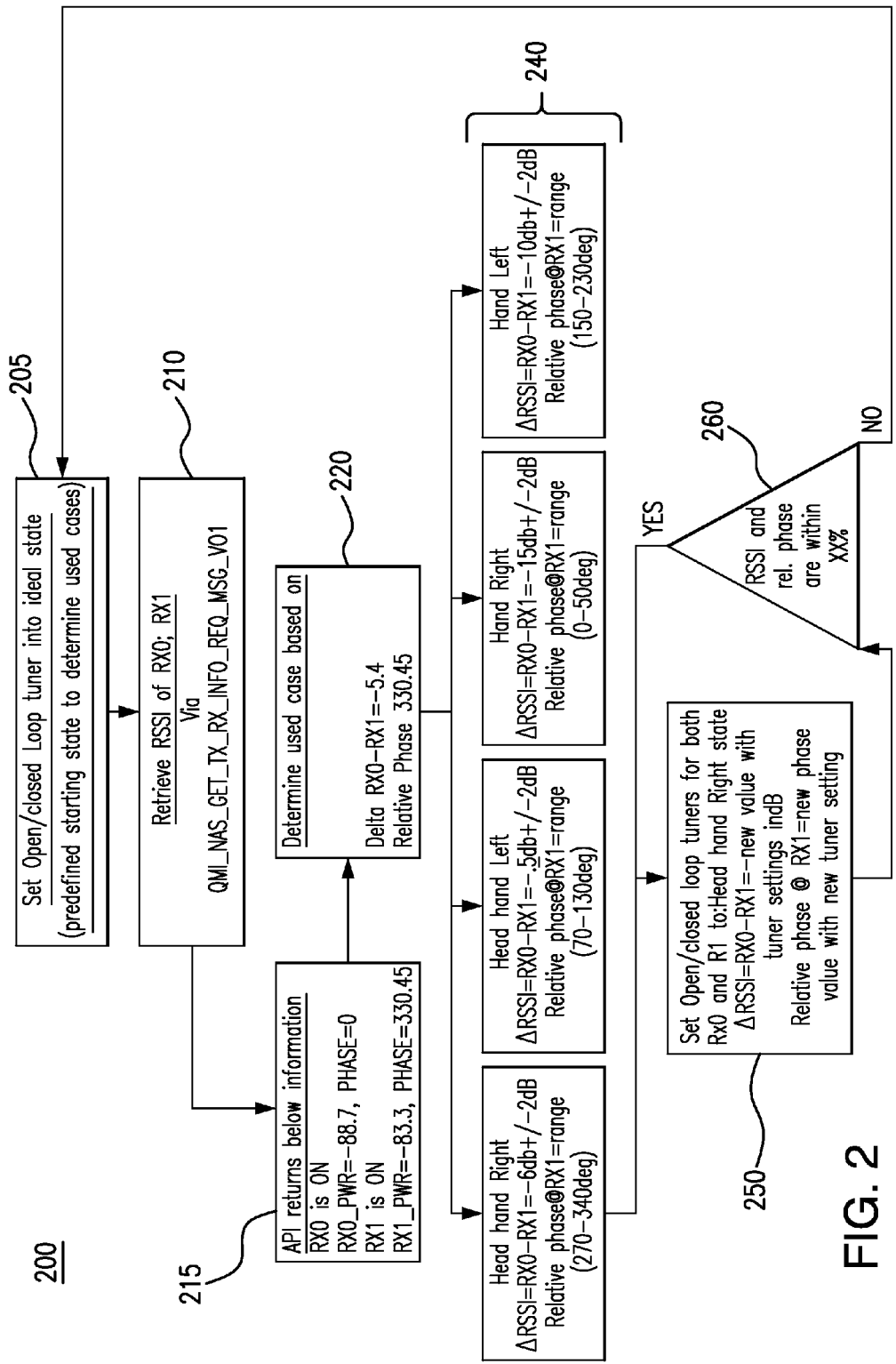
FIG. 2 depicts an exemplary method operating in the communication device in FIG. 1.

Referring to FIG. 2, method 200 is illustrated which can be utilized by the communication device 100 for identifying or otherwise determining the present use case for the communication device. Method 200 can be practiced with more or less than the steps illustrated in FIG. 2, and can be practiced by various communication devices, including communication device 100. At 205, an initial or ideal state can be implemented by the matching networks 110, 125 in order to obtain antenna parameters. The particular initial state of the matching networks can vary and can be pre-defined, such as based on empirical data which indicates an initial state that affords a more accurate determination of antenna parameters. For instance, the initial state at 205 can be settings for the variable reactive elements that correspond with a free-state operation of the phone. Other initial states for the tuning network can be utilized that provide a baseline or zero-line for determining operational data for the antennas.

At 210, operational data associated with at least two antennas (e.g., first antenna 105 and second antenna 120) of a multi-antenna system can be requested. The operational data can include RSSI information and phase information. At 215, the operational data, such as the RSSI and phase information, can be retrieved. The particular component retrieving the information can vary and can include a detector or an application programming interface. In this example, step 215 retrieves an RSSI of −88.7 and a phase of 0 for the first antenna 105 and an RSSI of −83.3 and a phase of 330.45 for the second antenna 120. These values are meant to be exemplary and other values can be retrieved as a result of the particular use case effecting the antennas' operation.

At 220, the operational data differential can be determined, such as the RSSI differential (e.g., −5.4) and the phase differential (e.g., 330.45). At 240, a use case can be selected from a group of use cases that are mapped to the operational data differential, which in this embodiment is the RSSI differential and the phase differential. The mapping can be based on empirical data that was pre-determined, such as during chamber testing for the model of the mobile communication device. The group of use cases and the corresponding mapping can be configured in a look-up table (e.g., table 300 shown in FIG. 3) so that the controller circuit 180 can select the use case from among the group of stored use cases based on the differentials. In this example, the RSSI differential of −5.4 and the phase differential of 330.45 is mapped to a use case of "head hand right" and is not mapped to the other use cases of "head hand left", "hand right" and "hand left."

At 250, the matching network(s) can be set or otherwise adjusted based on the selected use case. The exemplary embodiments can utilize open loop tuning, closed loop tuning, or a combination of open and closed loop tuning. For example, the use case can be used in an open loop tuning algorithm in which variable reactances are directly selected, such as from another look up table, based on the selected use case. In another embodiment, the use case can be used as part of a closed loop algorithm in which the use case is a factor along with one or more measured parameters of the mobile communication device such as output power, return loss, received power, current drain or transmitter linearity. Other tuning algorithms can also be implemented that make use of the selected use case, such as utilizing the use case as a starting point in the tuning (e.g., utilizing the selected use case to achieve a 50 Ohm match) and then performing additional tuning, such as based on TRP, TIS, UL throughput and/or DL throughput. In one embodiment, at 260, tuning can be adjusted based on the RSSI and relative phase being within a desired range.

Method 200 enables a pair of data points for each antenna (e.g., RSSI and phase data points) to be utilized to select or otherwise determine a use case that the mobile communication device is presently operating in, such as operating in a flip open state, a slider out state, a hand's free operation state, a hand-held operation state, an ear-piece speaker operation state, or a speaker-phone operation state. In one or more embodiments, the use case can be determined without receiving any user input (indicating the use case) and without receiving any mechanical sensor information (such as a contact sensor detecting a flip open mechanical configuration of the mobile device). In one or more embodiments, the use case can be detected solely from at least two operational data associated with the antennas (e.g., RSSI and phase) and from a relationship between the at least two operational data for each of the antennas, such as based on the RSSI differential and the phase differential for the antennas.

Figure 5A:
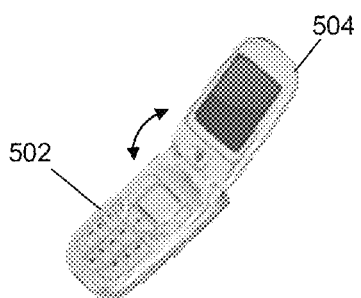
Figure 5B:
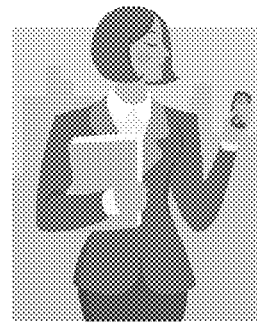
Figure 5C:
Figure 5D:
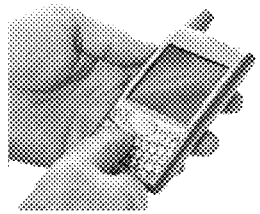
Figure 5E:
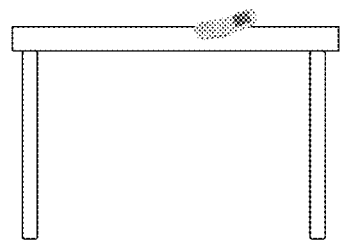

In one or more embodiments, another look-up table 400 as illustrated in FIG. 4 can be stored in a memory of a communication device (such as device 100), which can be indexed by a controller (such as controller 180 of the communication device 100 of FIG. 1) according to the determined or detected use case of the communication device 100, as well as one or more other criteria, including the operational frequency band. In one or more embodiments, the physical use case can represent a physical state of the communication device, while a functional use case can represent an operational state of the communication device. For example, for a flip phone 500 of FIG. 5a, an open flip can represent one physical use case, while a closed flip can represent another physical use case. In a closed flip state (i.e., bottom and top flips 502-504 are aligned), a user may have his/her hands surrounding the top flip 502 and the bottom flip 504 while holding the phone 500, which can result in one range of load impedances experienced by an internal or retrievable antenna (not shown) of the phone 500. The range of load impedances of the internal or retrievable antenna can be determined by empirical analysis. With the flip open a user may hold the bottom flip 502 with one hand while positioning the top flip 504 near the user's ear when an audio system of the phone 500 is set to low volume. If, on the other hand, the audio system is in speakerphone mode, the user may be positioning the top flip 504 away from the user's ear. In these arrangements, different ranges of load impedances can be experienced by the internal or retrievable antenna, which can be analyzed empirically. The low and high volume states of the audio system illustrate varying functional use cases. Other examples of use cases can include handheld operations such as shown by FIG. 5B, handheld and phone-to-head operations such as shown in FIG. 5C, handheld and typing operations as shown in FIG. 5D, and operations while on a metal table as shown in FIG. 5E. These are a few examples of use cases and more use cases can be determined or detected according to method 200 in the exemplary embodiments. In one or more embodiments, the determined or detected use case can be either or both of a physical or functional use case.

For a phone 600 with a slideable keypad 604 (illustrated in FIG. 6), the keypad in an outward position can present one range of load impedances of an internal antenna, while the keypad in a hidden position can present another range of load impedances, each of which can be analyzed empirically. For a smartphone 700 (illustrated in FIG. 7) presenting a video game, the user may hold the phone away from the user's ear in order to view the game. Placing the smartphone 700 in a portrait position 702 can represent one physical and operational use case, while utilizing the smartphone 700 in a landscape position 704 presents another physical and operational use case.

A multimode phone 800 capable of facilitating multiple access technologies such as GSM, CDMA, LTE, WiFi, GPS, and/or Bluetooth in two or more combinations can provide additional insight into possible ranges of impedances experienced by two or more internal antennas of the multimode phone 800. For example, a multimode phone 800 that provides GPS services by processing signals received from a constellation of satellites 802, 804 can be empirically analyzed when other access technologies are also in use. Suppose, for instance, that while navigation services are enabled, the multimode phone 800 is facilitating voice communications by exchanging wireless messages with a cellular base station 806. In this state, an internal antenna of the GPS receiver may be affected by a use case of a user holding the multimode phone 800 (e.g., near the user's ear or away from the user's ear). The affect on the GPS receiver antenna and the GSM antenna by the user's hand position can be empirically analyzed.

Suppose in another scenario that the antenna of a GSM transceiver is in close proximity to the antenna of a WiFi transceiver. Further assume that the GSM frequency band used to facilitate voice communications is near the operational frequency of the WiFi transceiver. Also assume that a use case for voice communications may result in certain physical states of the multimode phone 800 (e.g., slider out), which can result in a particular hand position of the user of the multimode phone 800. Such a physical and functional use case can affect the impedance range of the antenna of the WiFi transceiver as well as the antenna of the GSM transceiver.

A close proximity between the WiFi and GSM antennas and the near operational frequency of the antennas may also result in cross-coupling between the antennas, thereby changing the load impedance of each of the antennas. Cross-coupling under these circumstances can be measured empirically. Similarly, empirical measurements of the impedances of other internal antennas can be measured for particular physical and functional use configurations when utilizing Bluetooth, WiFi, Zigbee, or other access technologies in peer-to-peer communications with another communication device 808 or with a wireless access point 810.

The number of physical and functional use cases of the communication device 100 can be substantial when accounting for combinations of access technologies, frequency bands, antennas of multiple access technologies, antennas configured for diversity designs such as multiple-input and multiple output (MIMO) antennas, and so on. These combinations, however, can be empirically analyzed for load impedances and affects on other tunable circuits. The empirical data collected can be recorded in the look-up table of FIG. 4 and indexed according to corresponding combinations of physical and functional use cases, which in turn can be determined or detected, in whole or in part, by method 200 based on a comparison of operational parameters associated with the different antennas. In one or more embodiments, the information stored in the look-up table can be used in open-loop RF tuning applications to initialize tunable circuit components of a transceiver, as well as, tuning algorithms that control operational aspects of the tunable circuit components.

In one or more embodiments, the empirical data of the look-up table of FIG. 4 can be based on desired TRP and/or TIS, which can be indexed based on the determined or detected use cases. In this example, the empirical data can be obtained through chamber testing under various conditions, including under various use cases. In another embodiment, the empirical data can be indexed (in combination with, or in place of, the use cases) based on other factors including operating frequency, device mode of operation, device operating metrics, and so forth. In another embodiment, the empirical data of the look-up table of FIG. 4 can be based on desired UL and/or DL throughput, which can be indexed based on the determined or detected use cases according to method 200. In this embodiment, the empirical data can be indexed (in combination with, or in place of, the use cases) based on other factors including operating frequency, device mode of operation, device operating metrics, and so forth. In one or more embodiments, look-up tables 300 and 400 can be combined or otherwise arranged to facilitate a selection of the use case from among a group of use cases based on the comparison of the operational data associated with the antennas (e.g., the RSSI and phase differential) and to facilitate a selection of tuning states for the matching network(s) based at least in part on the determined or detected use cases (e.g., a tuning state that defines a variable reactance, such as a capacitance value, to be utilized for the tuning).

Figure 9:
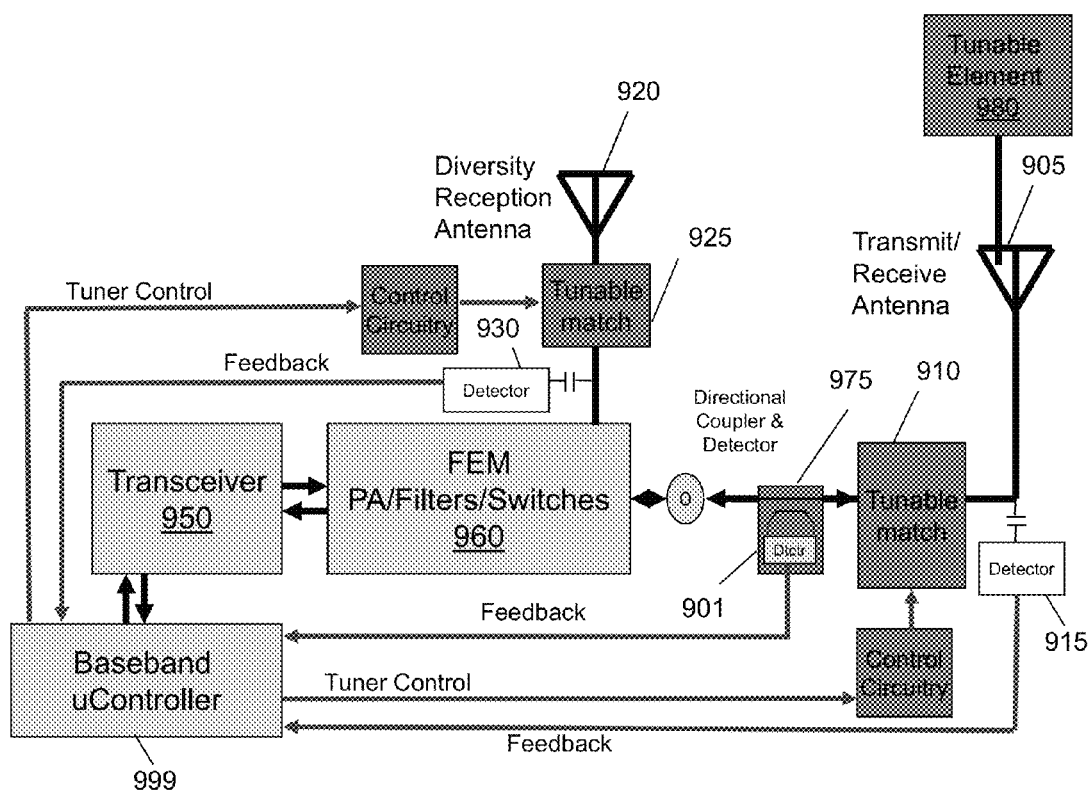
FIG. 9 depicts an illustrative embodiment of a portion of another multi-antenna communication device that can determine or detect use cases and perform impedance tuning.

In another exemplary embodiment, FIG. 9 depicts a portion of a communication device 900 (such as device 100 in FIG. 1) having tunable matching networks for use with a multiple antenna system. In this exemplary embodiment, there are two antennas, which are a transmit/receive antenna 905 and a diversity reception antenna 920. However, it should be understood that other numbers, types and/or configurations of antennas can be utilized with device 900. For instance, the antennas can be spatially diverse, pattern diverse, polarization diverse and/or adaptive array antennas. Tunable elements 980 can be connected with radiating elements or a portion thereof of the antenna 905 for "on-antenna" tuning. In another embodiment, tunable elements 980 can be connected with multiple antennas (not shown). Tunable elements 980 allow for tuning and/or detuning of one or more of the antennas, including in combination with the tuning of the matching networks 910 and/or 925, which can be connected at the feed or port of the one or more antennas.

In one embodiment, the antennas of communication device 900 can be part of a MIMO (multiple-input and multiple output) system. The multiple antennas can be utilized for improving communications, such as through switching or selecting techniques, including analyzing noise in the multiple signals and selecting the most appropriate signal. The multiple antennas can also be used with combining techniques where the signals can be added together, such as equal gain combining or maximal-ratio combining. Other techniques for utilizing multiple signals from multiple antennas are also contemplated by the exemplary embodiments, including dynamic systems that can adjust the particular techniques being utilized, such as selectively applying a switching technique and a combination technique. The particular position(s) of the antenna(s) can vary and can be selected based on a number of factors, including being in close enough proximity to couple RF energy with each other.

Communication device 900 can include a number of other components such as directional couplers, sensor ICs, bias control and other control ICs. This example also includes a transceiver 950 of the communication device 900 that includes multiple receivers and/or transmitters for the multiple antennas 905 and 920 to serve the purpose of diversity reception.

In one embodiment, a first tunable matching network 910 can be coupled at the feed or port of the transmit/receive antenna 905 and a second tunable matching network 925 can be coupled to the feed or port of the diversity reception antenna 920. Both of these matching networks 910 and 925 can be adjusted (e.g., tuned) to improve performance of the communication device 900 in response to changes in bands, frequencies of operation, determined or detected use cases, and/or proximity of the antennas 905 and 920 to the user or other objects which can affect the impedances presented by the antennas to the Front End Module (FEM) 960 and transceiver 950. In one embodiment, the feedback line could be removed, such as by using the FEM to route signals appropriately to perform these measurements (e.g., avoiding filtering out the signals). The tuning of one or more of matching network 910, matching network 925 or tunable element 980 can be based on other criteria, such as improving TRP, TIS, UL throughput and/or DL throughput. In one or more embodiments, a controller 999 can be used for determining tuning states or settings for one or more of the matching network 910, matching network 925 or tunable element 980, such as providing a bias voltage to voltage tunable capacitors of the matching network(s) or tunable element.

In one or more embodiments, the controller 999 can receive operational data (e.g., RSSI information and phase information) for each of the antennas 905, 920. The operational data can be received from one or more detectors, such as detector 901, detector 915, detector 930 or directional coupler 975. The controller 999 can compare the operational data for the antennas to determine a relationship between the data, such as determining a differential between the RSSI information and the phase information between antenna 905 and antenna 920. The controller 999 can use the differential information (or other data from a comparison between the antennas' operational parameters) to determine a present use case for the communication device 900. In one or more embodiments, controller 999 can determine or otherwise detect the use case without user input and without mechanical sensor information (such as a mechanical sensor that alarms when the slider is pushed out). In one or more embodiments, the controller 999 can select the use case from a look-up table stored in a memory of the device 900 in which a group of use cases are mapped to operational data associated with the antennas, such as pairs of differentials of operational data for the antennas 905, 920, which may include RSSI and phase differentials for the antennas 905, 920. For instance, the controller 999 can detect that the device 900 is in the use case of "head hand right" based on the RSSI and phase differentials for the antennas 905, 920 listed in the look-up table which correspond to this use case. The look-up table can be provisioned or otherwise provided to the device 900 where the use cases and mapping to the operational data (e.g., RSSI and phase differential) are determined based on empirical data during development or manufacture, such as during chamber testing.

The tuning of one or more of matching network 910, matching network 925 or tunable element 980 can be based on the determined or detected use case. In one or more embodiments, the determined use case can be used in another look-up table (e.g., table 400) to identify reactance values that can be used in one or more of matching network 910, matching network 925 or tunable element 980. In this example, the tuning can be performed without using additional criteria, such as other parameter measurements. In another example, the use case can be used in combination with other criteria, such as measured parameters of the device 900 (e.g., transmitter reflection loss, output power of the transmitter, current drain and/or transmitter linearity).

In one or more embodiments, tunable matching networks 910 and/or 925 and/or tunable element 980 can be adjusted using other methods and/or components, some of which were disclosed in U.S. Patent Application Publication No. 2009/0121963, the disclosure of which is hereby incorporated by reference. In one embodiment, the detector 930 can be coupled to the device 900 so as to detect RF voltage present at the connection to the diversity reception antenna 920. Received power levels at this point may be below −50 dBm. Some detectors, such as a diode detector or a logarithmic amplifier, may not typically be adequate to detect such levels. However, since in this exemplary embodiment, the two antennas 905 and 920 are in the same device 900 and in proximity to each other, they can inherently couple RF energy from one antenna to the other. While the communication device 900 does not require this coupling, its presence can be utilized by the exemplary embodiments for the purposes of tuning the antenna matching networks. In one example, after establishing the tuning state for the diversity match at the transmit frequency, a predetermined relationship or offset can be applied to the matching network 925 in order to adjust the match to the receiver operating frequency.

In another embodiment, after tunable matching network 910 is adjusted by the algorithm, tunable matching network 925 can also be adjusted. By measuring the coupled transmitted power present at detector 930, the tunable matching network 925 can be adjusted to increase coupled transmitter power seen at detector 930. In one example, after establishing the tuning state for the diversity match at the transmit frequency, a predetermined relationship or offset can be applied to the matching network 925 in order to adjust the match to the receiver operating frequency. For instance, the tuning circuits can be adjusted initially based on transmitter oriented metrics and then a predetermined relationship or offset can be applied to attain a desired tuning state for both transmitter and receiver operation. In another embodiment, the operational metric can be one or more of transmitter reflection loss, output power of the transmitter, current drain and/or transmitter linearity. For example, in a time division multiplexed (TDM) system in which the transmitter and the receiver operate at different frequencies but only operate in their respective time slots (i.e., transmit time slot and receive time slot), this can be accomplished by identifying an optimal tuning for the transmitter and then adding an empirically derived adjustment to the tuning circuits in receive mode. As another example, in a frequency division multiplexed (FDM) system in which the transmitter and receiver operate simultaneously and at different frequencies, this can be accomplished by identifying a target operation for the transmitter, and then adjusting the tuning circuits first to the target value for the transmitter and then adjusting the values to approach a compromised value proximate to an equal or desired target value for the receiver. These tuning techniques can also be used in combination with the determined or detected use case based on the RSSI and phase differentials that are mapped into the look-up table.

In one embodiment, a predetermined relationship, (e.g., an offset, scaling factor, translation or other change or modification) can be applied to the adjustments of the variable components when switching from the transmit mode to the receive mode. This translation can be a function of the values obtained while adjusting during the transmit time slot. The translation can then be removed upon return to the transmitter mode and the adjustment process is resumed. In one embodiment, because any frequency offset between the transmit signal and the receive signal may be known, an adjustment or modification of the setting of the matching network in the form of a translation or some other function can be applied to the matching network during the receive time slot. In another embodiment, the adjustment can be performed in multiple steps if the transmission and reception frequencies are far apart.

In another embodiment, a Figure of Merit can be utilized that not only incorporates the transmit metrics, but also incorporates an element to attain a compromise between optimal transmitter and optimal receiver operation. This can be accomplished by identifying a target operation goal, such as a desired transmitter and receiver reflection loss and then identifying an operational setting that is a close compromise between the two. This embodiment thus can incorporate not only transmitter metrics but also tuning circuit settings or preferences into the algorithm. The tuning preferences can be empirically identified to ensure the desired operation.

In one embodiment where the communication device 900 employs antenna diversity for receive operation but does not employ antenna diversity for transmit operation, antenna 920 may be receive only. The transceiver can transmit on antenna 905 and can receive on both antennas 905 and 920. For adaptive closed loop tuning of the tunable matching network 925 on the diversity antenna, the communication device 900 can obtain a metric indicating the performance of the tunable matching circuit at the receive frequency. The metric can be used to tune the match to adjust the performance at the receive frequency. This can be done by measuring the level of the received signal using the receiver in the transceiver IC (i.e., the RSSI). This technique can also be combined with the determined or detected use case based on the RSSI and phase differentials that are mapped into the look-up table. In this embodiment, the transmit signal may be moderately coupled to the tunable match in the diversity path because the main antenna and the diversity antenna are located on the same communications device. The main antenna and the diversity antenna may only have 20 dB isolation in many cases. The transmit signal present at tunable match 925 may be a much stronger and more stable signal than the receive signal present at tunable matching network 925. The transmit signal can be used to make reliable measurements that can be used for closed loop tuning.

The transmit signal can be measured using detector 930. The detector can be placed between the tunable match and the transceiver. This is effectively the output of the tunable match. A directional coupler may not be necessary for this measurement in this embodiment, and capacitive or resistive coupling may be used, as long as the detector has sufficient dynamic range. Other components and configurations of the components can also be utilized for the parameter detection, such as shown in U.S. Patent Publication No. 20090039976 by McKinzie, the disclosure of which is hereby incorporated by reference. In this embodiment, maximizing the output voltage of a tunable match can be the equivalent to minimizing insertion loss, and for a lossless network it can be equivalent to minimizing mismatch loss. An alternative to using detector 930 can be to use the receiver itself (tuned to the transmit frequency) to measure the transmit signal. These are a few viable methods for measuring the transmit signal through the diversity tunable match. Other forms of signal detection are contemplated by the present disclosure.

Another exemplary embodiment can use detector 930 of the communication device 900 in the diversity path as feedback to adjust tunable matching network 910 on the main antenna 905. The tunable matching network 910 coupled with the main antenna has both transmit and receive signals, and can be optimized for Tx performance, Rx performance, and Duplex performance. For the Tx solution, Vout can be maximized. For the Rx solution and the Duplex solution, dVout can be included in the Figure of Merit. A PTC preference may be used to identify the optimal Rx solution but is not required to identify the optimal duplex solution.

In one or more exemplary embodiments, the Figure of Merit may be constructed such that when it equals a certain value, or is minimized or maximized, the desired tuner settings are achieved. The Figure of Merit may be used with a number of different optimization algorithms that can include utilization of the determined or detected use case based on the RSSI and phase differentials that are mapped into the look-up table. For example, a more exhaustive approach may be used that evaluates the Figure of Merit at every combination of capacitor values. Other suitable algorithms can also be utilized, including a simplex algorithm, a binary search algorithm, and/or a gradient algorithm.

Figure 10:
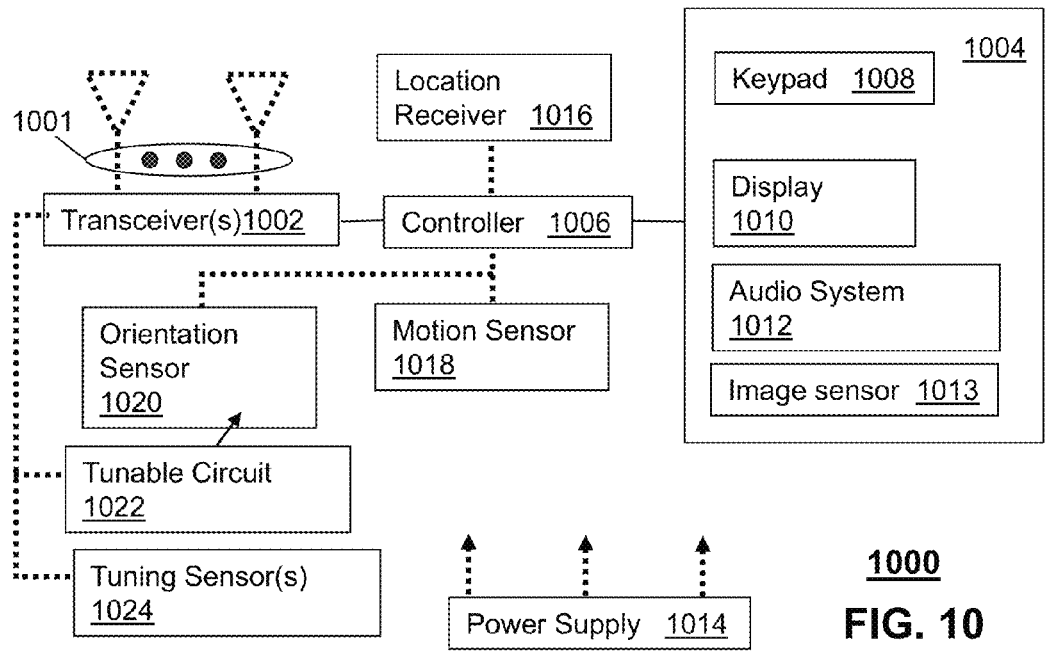
FIG. 10 depicts an illustrative embodiment of a portion of another multi-antenna communication device that can determine or detect use cases and perform impedance tuning.

FIG. 10 depicts an illustrative embodiment of a communication device 1000. Communication device 1000 can include a controller 1006 which can determine or detect use cases based on a comparison of operational data (e.g., RSSI and phase differential) associated with different antennas 1001. The communication device 1000 can comprise one or more transceivers 1002 coupled to the antennas 1001, each having transmitter and receiver sections (herein transceiver 1002), a tunable circuit 1022, one or more tuning sensors 1024, a user interface (UI) 1004, a power supply 1014, a location receiver 1016, a motion sensor 1018, an orientation sensor 1020, and a controller 1006 for managing operations thereof. The determined or detected use case(s) can be utilized by the controller 1006 for adjusting the tunable circuit 1024. The tuning sensor(s) can be used for detecting the operational parameters associated with the antennas 1001 and/or detecting other operational parameters that can be used in a tuning algorithm. The transceiver 1002 can support short-range or long-range wireless access technologies such as Bluetooth, ZigBee, WiFi, DECT, or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1002 can also be adapted to support circuit-switched wireline access technologies (such as PSTN), packet-switched wireline access technologies (such as TCP/IP, VoIP, etc.), and combinations thereof.

The tunable circuit 1022 can comprise variable reactive elements such as variable capacitors, variable inductors, or combinations thereof that are tunable with digital and/or analog bias signals based in part on the determined or detected use case for the communication device 1000. The tunable circuit 1022 can represent a tunable matching network coupled to one or more of the antennas 1001 to compensate for a change in impedance of the antenna(s) 1001, a compensation circuit to compensate for mutual coupling in the multi-antenna system, an amplifier tuning circuit to control operations of an amplifier of the transceiver 1002, a filter tuning circuit to alter a pass band of a filter of the transceiver 1002, and so on. The tuning sensors 1024 can be placed at any stage of the transceiver 1002 such as before or after a matching network 1102 shown in FIG. 11. The tuning sensors or detectors 1024 can utilize any suitable sensing technology such as directional couplers, voltage dividers, or other sensing technologies to measure signals at any stage of the transceiver 1002. The measured signals can be provided to the controller 1006 by way of analog-to-digital converters included in the tuning sensors 1024 for processing and tuning a variable reactance of the tunable circuit 1022.

The UI 1004 can include a depressible or touch-sensitive keypad 1008 with a navigation mechanism such as a roller ball, a joystick, a mouse, or a navigation disk for manipulating operations of the communication device 1000. The keypad 1008 can be an integral part of a housing assembly of the communication device 1000 or an independent device operably coupled thereto by a tethered wireline interface (such as a USB cable) or a wireless interface supporting, for example, Bluetooth. The keypad 1008 can represent a numeric keypad commonly used by phones, and/or a QWERTY keypad with alphanumeric keys. The UI 1004 can further include a display 1010 such as monochrome or color LCD (Liquid Crystal Display), OLED (Organic Light Emitting Diode) or other suitable display technology for conveying images to an end user of the communication device 1000. In an embodiment where the display 1010 is touch-sensitive, a portion or all of the keypad 1008 can be presented by way of the display 1010 with navigation features.

The display 1010 can use touch screen technology to also serve as a user interface for detecting user input. As a touch screen display, the communication device 1000 can be adapted to present a user interface with graphical user interface (GUI) elements that can be selected by a user with a touch of a finger. The touch screen display 1010 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1010 can be an integral part of the housing assembly of the communication device 1000 or an independent device communicatively coupled thereto by a tethered wireline interface (such as a cable) or a wireless interface.

The UI 1004 can also include an audio system 1012 that utilizes audio technology for conveying low volume audio (such as audio heard in proximity of a human ear) and high volume audio (such as speakerphone for hands free operation). The audio system 1012 can further include a microphone for receiving audible signals of an end user. The audio system 1012 can also be used for voice recognition applications. The UI 1004 can further include an image sensor 1013 such as a charged coupled device (CCD) camera for capturing still or moving images.

The power supply 1014 can utilize common power management technologies such as replaceable and rechargeable batteries, supply regulation technologies, and/or charging system technologies for supplying energy to the components of the communication device 1000 to facilitate long-range or short-range portable applications. Alternatively, or in combination, the charging system can utilize external power sources such as DC power supplied over a physical interface such as a USB port or other suitable tethering technologies.

The location receiver 1016 can utilize location technology such as a global positioning system (GPS) receiver capable of assisted GPS for identifying a location of the communication device 1000 based on signals generated by a constellation of GPS satellites, which can be used for facilitating location services such as navigation. The motion sensor 1018 can utilize motion sensing technology such as an accelerometer, a gyroscope, or other suitable motion sensing technology to detect motion of the communication device 1000 in three-dimensional space. The orientation sensor 1020 can utilize orientation sensing technology such as a magnetometer to detect the orientation of the communication device 1000 (north, south, west, and east, as well as combined orientations in degrees, minutes, or other suitable orientation metrics).

The communication device 1000 can use the transceiver 1002 to also determine a proximity to or distance to cellular, WiFi, Bluetooth, or other wireless access points by sensing techniques such as utilizing a received signal strength indicator (RSSI) and/or signal time of arrival (TOA) or time of flight (TOF) measurements. The controller 1006 can utilize computing technologies such as a microprocessor, a digital signal processor (DSP), and/or a video processor with associated storage memory such as Flash, ROM, RAM, SRAM, DRAM or other storage technologies for executing computer instructions, controlling, and processing data supplied by the aforementioned components of the communication device 1000.

Other components not shown in FIG. 10 are contemplated by the subject disclosure. The communication device 1000 can include a slot for inserting or removing an identity module such as a Subscriber Identity Module (SIM) card. SIM cards can be used for identifying and registering for subscriber services, executing computer programs, storing subscriber data, and so forth. The communication device 1000 as described herein can operate with more or less of the circuit components shown in FIG. 10. It is further noted that communication device 1000 be an integral part of consumer or industrial devices such as cellular phones, computers, laptops, tablets, utility meters, telemetry measurement devices, and so on.

Figure 11:
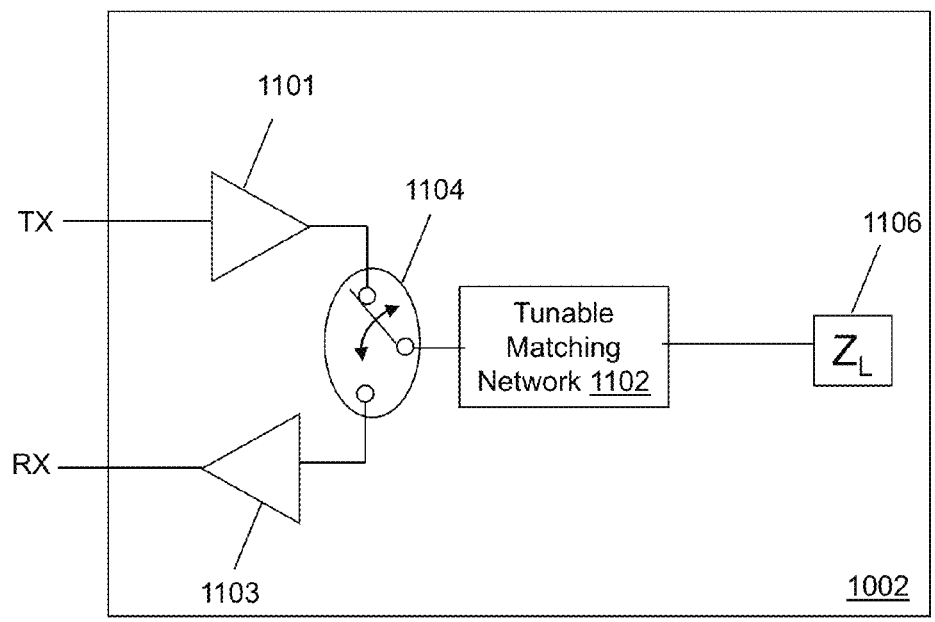
FIG. 11 depicts an illustrative embodiment of a portion of a transceiver of the communication device of FIG. 1.

FIG. 11 depicts an illustrative embodiment of a portion of the wireless transceiver 1002 of the communication device 1000 of FIG. 10. In one embodiment, such as for GSM applications, the transmit and receive portions of the transceiver 1002 can include amplifiers 1101, 1103 coupled to a tunable matching network 1102 and an impedance load 1106 by way of a switch 1104. The load 1106 in the present illustration can include one of the antennas as shown in FIG. 10 (herein antenna 1106). A transmit signal in the form of a radio frequency (RF) signal (TX) can be directed to the amplifier 1101 which amplifies the signal and directs the amplified signal to the antenna 1106 by way of the tunable matching network 1102 when switch 1104 is enabled for a transmission session. The receive portion of the transceiver 102 can utilize a pre-amplifier 1103 which amplifies signals received from the antenna 1106 by way of the tunable matching network 1102 when switch 1104 is enabled for a receive session. Other configurations of FIG. 11 are possible for other types of cellular access technologies, such as CDMA. These undisclosed configurations are contemplated by the present disclosure.

Figure 12:
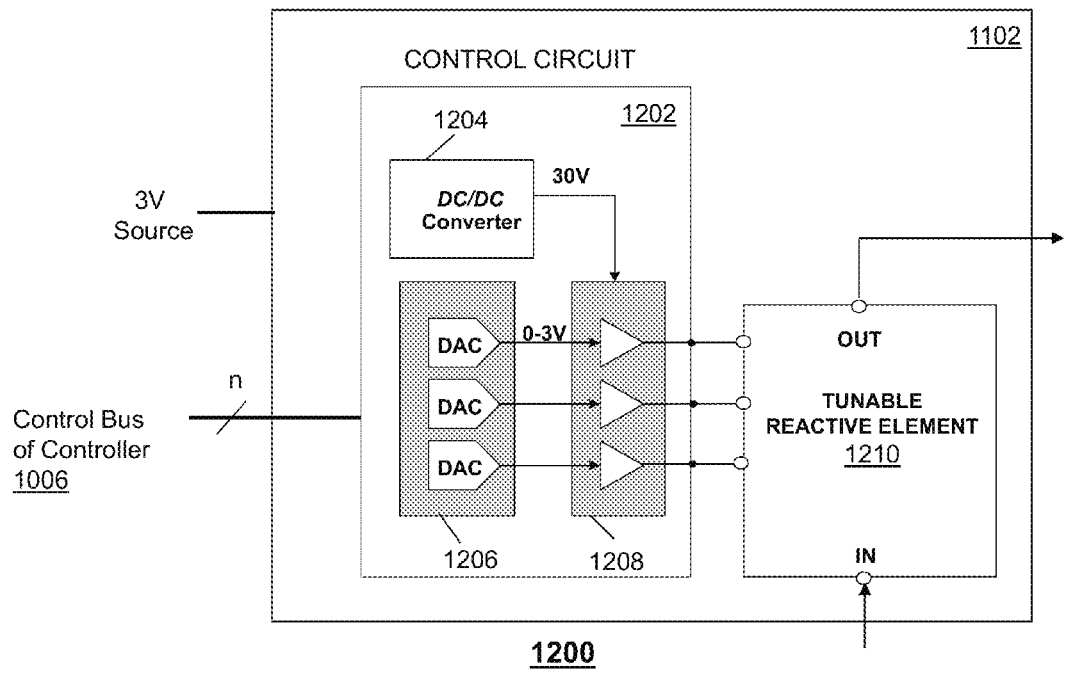
FIGS. 12-13 depict illustrative embodiments of a tunable matching network of the transceiver of FIG. 11.
Figure 13:
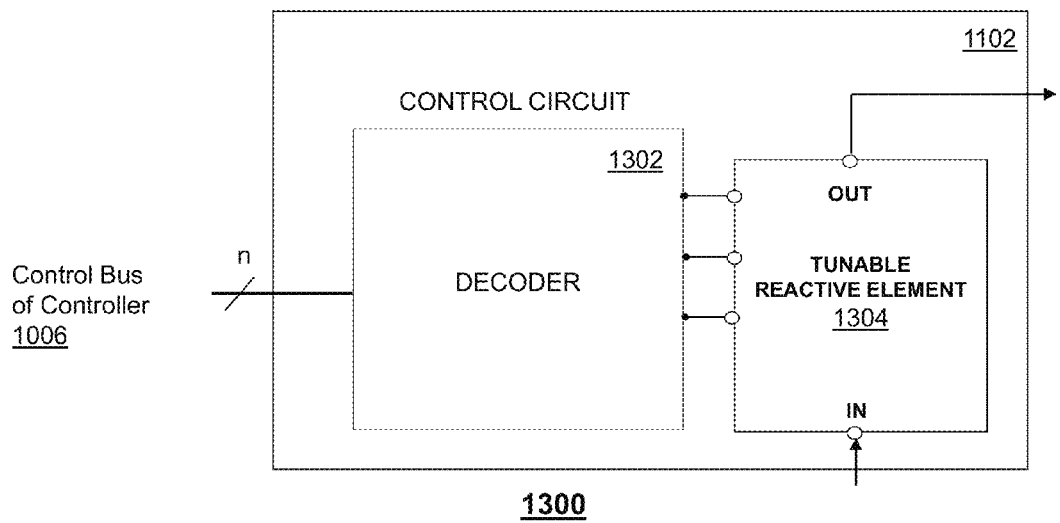
Figure 14:
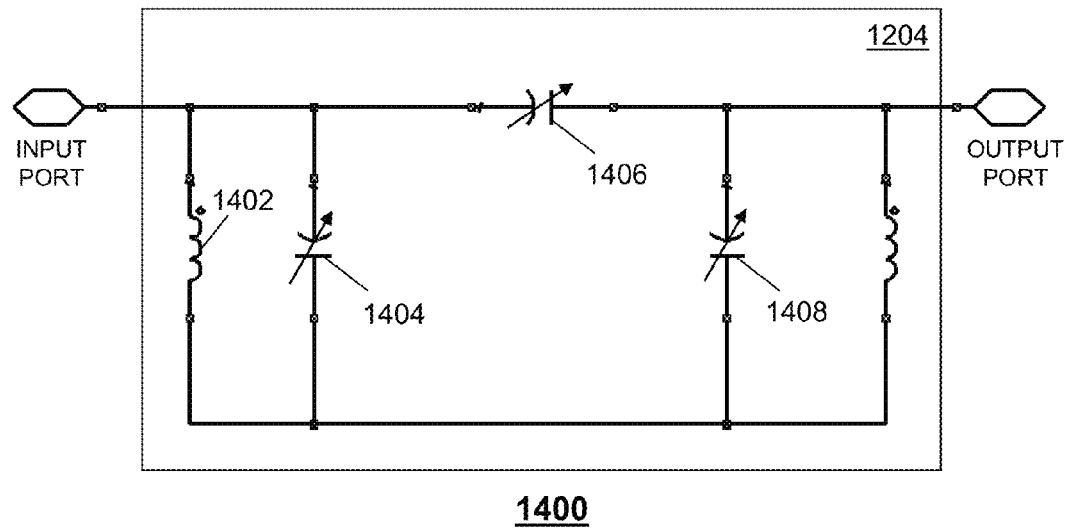
FIGS. 14-15 depict illustrative embodiments of a tunable reactive element of the tunable matching network of FIGS. 12-13.

FIGS. 12-13 depict illustrative embodiments of the tunable matching network 1102 of the transceiver 1002 of FIG. 11. In one embodiment, the tunable matching network 1102 can comprise a control circuit 1202 and a tunable reactive element 1210. The control circuit 1202 can comprise a DC-to-DC converter 1204, one or more digital to analog converters (DACs) 1206 and one or more corresponding buffers 1208 to amplify the voltage generated by each DAC. The amplified signal can be fed to one or more tunable reactive components 1404, 1406 and 1408 such as shown in FIG. 14, which depicts a possible circuit configuration for the tunable reactive element 1210. In this illustration, the tunable reactive element 1210 includes three tunable capacitors 1404, 1406, 1408 and an inductor 1402 with a fixed inductance. Other circuit configurations are possible, including use of other components, and are thereby contemplated by the present disclosure.

The tunable capacitors 1404, 1406, 1408 can each utilize technology that enables tunability of the capacitance of said component. One embodiment of the tunable capacitors 1404, 1406, 1408 can utilize voltage or current tunable dielectric materials such as a composition of barium strontium titanate (BST). An illustration of a BST composition is the Parascan® Tunable Capacitor. In another embodiment, the tunable reactive element 1210 can utilize semiconductor varactors. Other present or next generation methods or material compositions that can support a means for a voltage or current tunable reactive element are contemplated by the present disclosure.

The DC-to-DC converter 1204 can receive a power signal such as 3 Volts from the power supply 1014 of the communication device 1000 in FIG. 10. The DC-to-DC converter 1204 can use common technology to amplify this power signal to a higher range (e.g., 30 Volts) such as shown. The controller 1006 can supply digital signals to each of the DACs 306 by way of a control bus of "n" or more wires to individually control the capacitance of tunable capacitors 1404, 1406, 1408, thereby varying the collective reactance of the tunable matching network 1102. The control bus can be implemented with a two-wire common serial communications technology such as a Serial Peripheral Interface (SPI) bus. With an SPI bus, the controller 1006 can submit serialized digital signals to configure each DAC in FIG. 12 or the switches of the tunable reactive element 1304 of FIG. 13. The control circuit 1202 of FIG. 12 can utilize common digital logic to implement the SPI bus and to direct digital signals supplied by the controller 1006 to the DACs.

Figure 15:
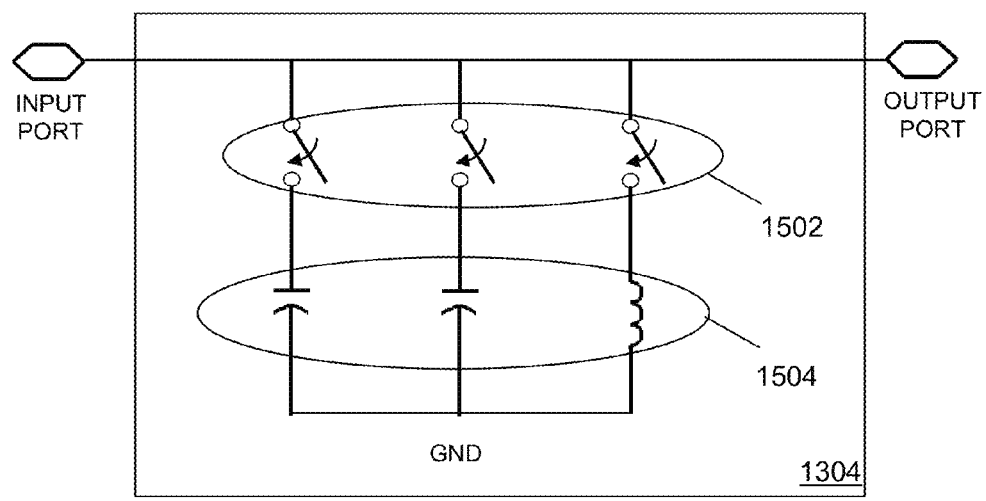

In another embodiment, the tunable matching network 1102 can comprise a control circuit 1302 in the form of a decoder and a tunable reactive element 1304 comprising switchable reactive elements such as shown in FIGS. 13 and 15. In this embodiment, the controller 1006 can supply the control circuit 1302 signals via the SPI bus which can be decoded with Boolean or state machine logic to individually enable or disable the switching elements 1502. The switching elements 1502 can be implemented using various types of switches, such as semiconductor switches or micromachined switches including those utilized in micro-electromechanical systems (MEMS). By independently enabling and disabling the reactive elements (capacitor or inductor) of FIG. 15 with the switching elements 1502, the collective reactance of the tunable reactive element 1304 can be varied.

The tunability of the tunable matching network 1102 provides the controller 1006 a means to optimize performance parameters of the transceiver 1002 such as, for example, but not limited to, transmitter power, transmitter efficiency, receiver sensitivity, power consumption of the communication device, a specific absorption rate (SAR) of energy by a human body, frequency band performance parameters, and so forth. To achieve one or more desirable performance characteristics which can be defined, the communication device 1000 can utilize a tuning state selection method, such as depicted in FIG. 2.

Other algorithms can be used for selecting a desired tuning state, and which may resolve any inaccuracy in determining a particular use case that affects the antenna environment and resulting antenna performance. For instance, the radio frequency and/or other RF information (e.g., band and sub-band) can be determined, and one or more usage conditions or factors such as, for example, but not limited to, audio path configuration, user interface mode of operation, and radio bearer type, can be used to determine a number of tuning state candidates, which have the highest probability of matching the actual environment of the communication device. An example of this algorithm is described in U.S. patent application Ser. No. 13/030,177 to Hoirup et al. filed on Feb. 18, 2011, the disclosure of which is hereby incorporated by reference.

In one or more embodiments, the look-up table that includes tuning settings or states can be static and/or dynamic. For example, the look-up table can be pre-loaded into the memory of the communication device based on known or estimated use cases, usage conditions or factors, and so forth. In another example, the look-up table can be populated or adjusted based on values determined during operation of the communication device, such as from a remote source transmitting the data. The tuning state candidates can be a subset of use cases that are selected from a group of use cases stored in a memory of the communication device, such as in tables 300, 400.

In one or more embodiments, the tuning algorithm can employ a threshold to remove the most unlikely tuning state candidates from consideration. When more than one tuning state candidate has been determined, the algorithm can resolve which candidate provides the desirable or best match by examining parameters such as those that are readily available in the wireless device. As an example, but not being limited thereto, the algorithm can utilize RSSI, Received Signal Code Power (RSCP), Received Signal Quality (RXQUAL), Received Bit Error Rate, current drain, transmit power control level, and so forth as parameters to select a tuning state from among the subset of tuning states that were identified via the look-up table. One of these or other parameters can be utilized alone in selecting from among the subset of identified tuning states or a combination of parameters can be utilized by the algorithm for performing the tuning state selection. In addition, feedback from a cellular base station can be utilized in the tuning process. For instance, if the handset is directed to transmit at a lower power step with one tuning state than another, that information could be utilized to determine which tuning state provides a better match for the handset transmitter. Other parameters can also be utilized for performing the tuning state selection from among the subset of tuning states, including parameters identified in various communication device standards. In one or more embodiments, the algorithm can set the tuning state and sample the parameter(s) resulting from that tuning state change. In one embodiment, at least one sample for each tuning state setting can be utilized. More samples may also be utilized in which case the sample order can be interleaved where n different possible tuning states can be set and RSSI or other parameter(s) measured for each, with each of the n states repeated m times. The resultant m measurements for each state can be then be averaged or otherwise processed in order to determine which tuning state will be chosen as the preferred state.

In one or more embodiments, the determined or detected use case according to method 200 or the other embodiments described herein can be utilized in tuning based on various goals, such as one or more of a better pre-determined antenna match (e.g., 50Ω) for each radio Tx/Rx band, achieving better TRP/TIS in the various use cases (e.g., free space, handheld, and other limited modes of operation), a better or best QoS with a lower or lowest power consumption. For example, radiated UL throughput can be compared with a desired UL throughput (e.g., a throughput threshold), such as through use of RSSI measurement, to determine whether tuning is to be performed to improve or maintain the radiated UL throughput. If tuning is to be utilized (e.g., the UL throughput is outside of a desired range) then an iterative process can be employed whereby the matching network is adjusted and the UL throughput is again compared with the throughput threshold to drive the UL throughput toward a desired value. Improvement of the UL throughput can be achieved by presenting the load impedance to a Tx power amplifier, which would provide better trade-off between TRP and EVM. If on the other hand, the UL throughput is in a desired range, then an iterative process can be employed whereby the transmit power is adjusted (e.g. reduced in incremental steps) and the UL throughput is again compared with the throughput threshold to maintain the UL throughput in the desired range. The incremental step sizes that are utilized for the transmit power reduction can be pre-determined or can be dynamic. One or more of the exemplary embodiments can take into account that an optimized TRP and/or TIS may not provide the best user experience. In one or more embodiments, the best user experience can be defined by quality of service parameters, such as voice quality and/or data throughput. QoS is not directly proportional or otherwise 100% related to TRP and TIS, which are just two variables of QoS function.

In one or more embodiments, the comparison of operational data of the different antennas, such as the differential of the RSSI and phase information between two antennas, may provide more than one use case (such as where the differential is zero). In these cases, other criteria (including other operational parameters) can be used for selecting from among the more than one returned use case and/or a compromise or other selection strategy for the tuning state can be implemented based on the more than one returned use case.

Figure 16:
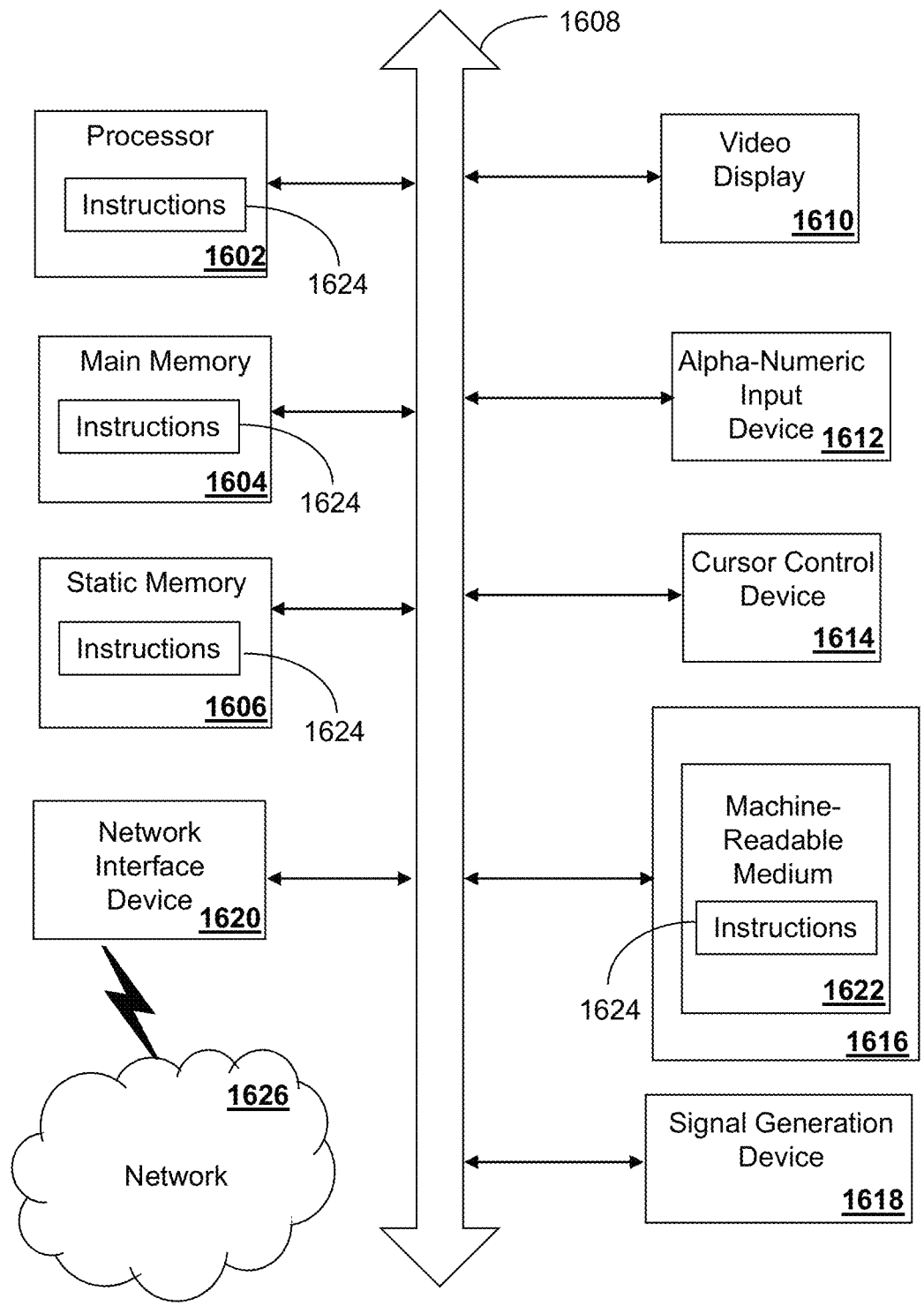
FIG. 16 depicts an exemplary diagrammatic representation of a machine in the form of a computer system within which a set of instructions, when executed, may cause the machine to perform any one or more of the methodologies disclosed herein.

FIG. 16 depicts an exemplary diagrammatic representation of a machine in the form of a computer system 1600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1600 may include a processor 1602 (e.g., a central processing unit (CPU), a graphics processing unit (GPU, or both), a main memory 1604 and a static memory 1606, which communicate with each other via a bus 1608. The computer system 1600 may further include a video display unit 1610 (e.g., a liquid crystal display (LCD), a flat panel, a solid state display, or a cathode ray tube (CRT)). The computer system 1600 may include an input device 1612 (e.g., a keyboard), a cursor control device 1614 (e.g., a mouse), a disk drive unit 1616, a signal generation device 1618 (e.g., a speaker or remote control) and a network interface device 1620.

The disk drive unit 1616 may include a machine-readable medium 1622 on which is stored one or more sets of instructions (e.g., software 1624) embodying any one or more of the methodologies or functions described herein, including those methods illustrated above. The instructions 1624 may also reside, completely or at least partially, within the main memory 1604, the static memory 1606, and/or within the processor 1602 during execution thereof by the computer system 1600. The main memory 1604 and the processor 1602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1624, or that which receives and executes instructions 1624 from a propagated signal so that a device connected to a network environment 1626 can send or receive voice, video or data, and to communicate over the network 1626 using the instructions 1624. The instructions 1624 may further be transmitted or received over a network 1626 via the network interface device 1620.

While the machine-readable medium 1622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile communication device comprising:
   a transceiver;
   a first antenna and a first matching network coupled with the transceiver, wherein the first matching network includes a first tunable element with a variable reactance for impedance tuning, wherein the first matching network is tuned to an initial state;
   a second antenna and a second matching network coupled with the transceiver, wherein the second matching network includes a second tunable element with a variable reactance for impedance tuning, wherein the second matching network is tuned to the initial state;
   a first circuit node between the first matching network and a transceiver;
   a second circuit node between the second matching network and the transceiver;
   a detector coupled with the first matching network and the second matching network by way of the first circuit node and the second circuit node, wherein the detector obtains a first Receive Signal Strength Indicator (RSSI) information and a first radio frequency (RF) phase for a first wireless RF signal at the first antenna, based on the first matching network being tuned to the initial state, and a second RSSI information and a second RF phase for a second wireless RF signal at the second antenna, based on the second matching network being tuned to the initial state; and
   a controller circuit coupled with the detector and the first matching network and the second matching network,
   wherein the controller circuit analyzes the first RSSI information and the second RSSI information to determine an RSSI differential between the first antenna and the second antenna,
   wherein the controller circuit analyzes the first RF phase and the second RF phase to determine an RF phase differential between the first antenna and the second antenna, and
   wherein the controller circuit selects a use case to obtain a selected use case for the mobile communication device from among a group of use cases based on a determination that the RSSI differential lies within a range of RSSI differentials associated with the selected use case and on a determination that the RF phase differential lies within a range of RF phase differentials associated with the selected use case.

2. The mobile communication device of claim 1, wherein the use case corresponds to a flip open state, a slider out state, a hand's free operation state, a hand-held operation state, an ear-piece speaker operation state, or a speakerphone operation state, and wherein the controller circuit, having selected a use case, selects a new use case to obtain an updated selected use case for the mobile communication device based on a change in one of the RSSI differential, the RF phase differential or both.

3. The mobile communication device of claim 2, further comprising:
a memory, wherein the group of use cases are stored in the memory, wherein each use case of the group of use cases is mapped to a corresponding range of values for RSSI differentials and a corresponding range of values for RF phase differentials, and wherein the first antenna differs from the second antenna in one of space, pattern, polarization or a combination thereof; and
a motion sensor that detects movement of the mobile communication device, wherein the controller selects the new use case responsive to the movement.

4. The mobile communication device of claim 1, wherein the controller circuit provides a first tuning control signal to the first matching network, wherein the tuning control signal is generated based on the selected use case and includes a first tuning setting for the variable reactance of the first tunable element of the first matching network, and wherein the first matching network adjusts the variable reactance of the first tunable element according to the first tuning setting.

5. The mobile communication device of claim 4, wherein the first tunable element is a first voltage tunable capacitor, and wherein the first tuning setting is a first bias voltage, and wherein the selecting of the use case by the controller is further based on one of the first RSSI information, the second RSSI information, the first RF phase, the second RF phase or a combination thereof.

6. The mobile communication device of claim 1, wherein the controller circuit provides a second tuning control signal to the second matching network, wherein the tuning control signal is generated based on the selected use case and includes a second tuning setting for the variable reactance of the second tunable element of the second matching network, and wherein the second matching network adjusts the variable reactance of the second tunable element according to the second tuning setting.

7. The mobile communication device of claim 4, wherein the second tunable element is a second voltage tunable capacitor, and wherein the second tuning setting is a second bias voltage.

8. The mobile communication device of claim 1, wherein the first matching network adjusts the variable reactance of the first tunable element according to a tuning setting that is determined based on the use case and based on an operating parameter.

9. The mobile communication device of claim 8, wherein the operating parameter comprises a return loss.

10. The mobile communication device of claim 1, wherein the first matching network adjusts the variable reactance of the first tunable element according to a tuning setting that is determined based on the use case and based on a total radiated power of the mobile communication device.

11. The mobile communication device of claim 1, wherein the first matching network adjusts the variable reactance of the first tunable element according to a tuning setting that is determined based on the selected use case and based on a total isotropic sensitivity of the mobile communication device.

12. The mobile communication device of claim 1, wherein the first matching network adjusts the variable reactance of the first tunable element according to a tuning setting that is determined based on the selected use case and based on one of an uplink throughput or a downlink throughput of the mobile communication device.

13. The mobile communication device of claim 1, further comprising a memory, wherein the group of use cases are stored in the memory, wherein each use case of the group of use cases is mapped to a corresponding range of RSSI differentials and a corresponding range of RF phase differentials, and wherein the group of use cases and the mappings to the corresponding ranges of the RSSI differentials and the RF phase differentials is based on empirical data obtained through chamber testing.

14. A method comprising:
obtaining, by a detector of a mobile communication device, first Receive Signal Strength Indicator (RSSI) information and a first radio frequency (RF) phase for a first wireless RF signal at a first antenna of the mobile communication device, based on a first matching network being tuned to an initial state, and second RSSI information and a second RF phase for a second wireless RF signal at a second antenna of the mobile communication device based on a second matching network being tuned to the initial state;
providing the first RSSI information and the second RSSI information and the first RF phase and the RF second phase to a controller circuit of the mobile communication device;
determining, by the controller circuit, an RSSI differential value and based on a difference between the first RSSI information and the second RSSI information, and an RF phase differential value based on a difference between the first RF phase and the second RF phase; and
selecting, by the controller circuit, a use case to obtain a selected use case for the mobile communication device from among a group of use cases based on the RSSI differential value lying within a range of RSSI differential values associated with the selected use case, and based on the RF phase differential value lying within a range of RF phase differential values associated with the selected use case.

15. The method of claim 14, wherein the selecting of the use case comprises retrieving the use case from a look-up table in a memory of the mobile communication device, wherein the group of use cases are mapped to a range of values for RSSI differential values and a range of values for RF phase differential values in the look up table.

16. The method of claim 14, further comprising adjusting a variable reactance of a tunable element of a matching network of the mobile communication device according to a tuning setting that is determined based on the selected use case, wherein the matching network is coupled with at least one of the first or second antennas.

17. The method of claim 16, wherein the tuning setting comprises a transmit tuning setting at a transmit frequency determined based on a measured parameter of the mobile communication device, the method further comprising:
determining one of a relationship or an offset between the transmit tuning setting and a receive tuning setting; and
applying, by the controller, the one of the relationship or the offset to the transmit tuning setting to obtain the receive tuning setting.

18. The method of claim 14, further comprising adjusting a variable reactance of a tunable element of a matching network of the mobile communication device according to a tuning setting that is determined based on the selected use case and based on empirical data associated with at least one of a total radiated power or a total isotropic sensitivity, wherein the matching network is coupled with at least one of the first or second antennas.

19. A communication device comprising:
a memory;
a transceiver;
a plurality of antennas coupled with the transceiver;
a matching network coupled with at least one of the plurality of antennas, wherein the matching network is tuned to an initial state;
a detector coupled with the matching network, wherein operational data obtained by the detector between the plurality of antennas and the transceiver for each individual antenna of the plurality of antennas, wherein the operational data is associated with at least two of the plurality of antennas, and wherein the operational data comprises a first RF phase value for a first antenna of the at least two of the plurality of antennas and a second RF phase value for a second antenna of the at least two of the plurality of antennas; and a controller circuit coupled with the detector and the matching network, wherein the controller circuit analyzes the operational data to determine an operational data differential value comprising an RF phase differential value between the at least two of the plurality of antennas, and wherein the controller circuit selects a use case to obtain a selected use case for the communication device from among a group of use cases stored in the memory, wherein each use case of the group of use cases is mapped at least to a corresponding range of RF phase differential values, and wherein the RF phase differential value lies within the corresponding range of RF phase differential values of the selected use case, and wherein the operational data includes Receive Signal Strength Indicator (RSSI) information, wherein the operational data differential value includes a Receive Signal Strength Indicator (RSSI) differential value determined between the at least two of the plurality of antennas, and wherein the matching network includes a variable reactance of a tunable element that is adjusted according to a tuning setting that is determined based on the selected use case.

* * * * *